Patented Sept. 5, 1939

2,171,871

UNITED STATES PATENT OFFICE 2,171,871

PREPARATION OF ORGANIC ACIDS

Joseph Frederic Walker, Niagara Falls, N. Y., assignor to E. I. du Pont de Nemours & Company, Wilmington, Del., a corporation of Delaware No Drawing. Application April 9, 1936,
Serial No. 73,601

11 Claims. (Cl. 260—515)

This invention relates to a method for producing organic acids and has for an object the conversion of organic acids to other organic acids.

As more fully explained below, it has been found heretofore that polycyclic aromatic hydrocarbons such as naphthalene, diphenyl, phenanthrene and the like, when dissolved in certain ether or amine solvents, readily react with sodium or other alkali metals to form colored solutions of alkali metal addition compounds. These colored solutions are highly reactive and, for example, readily react with compounds having replaceable hydrogen atoms to form the corresponding dihydro compounds of the polycyclic aromatic hydrocarbons, e. g., dihydronaphthalene, and the alkali metal substitution product of the reagent used.

I have now discovered that organic acids which have the groupings: —CH$_2$—COOH and >CH—COOH, when added to the above mentioned colored solution of an alkali metal addition compound of a polycyclic aromatic hydrocarbon, react in such manner that two atoms of the combined alkali metal become combined with one molecule of the acid, if the acid is monobasic. That is, two atoms of the metal react with each —CH$_2$—COOH or >CH—COOH group. Apparently the resulting organo-metallic compound formed is an alkali metal derivative of an acid salt and, in the case of sodium, may be represented as having the grouping: —CHNa—COONa.

I have found that these alkali metal derivatives of acid salts made in this manner may be reacted with various reagents reactive with alkali metal organic compounds, e. g., carbon dioxide, sulfur dioxide or organic halides, to produce valuable products. For example, the radical —CHNa—COONa may be reacted with carbon dioxide to form the dibasic radical

—CH(COONa)$_2$

The colored alkali metal addition compounds used to react with organic acids in accordance with the present invention may be obtained by the addition of an alkali metal to aromatic polycyclic hydrocarbons such as naphthalene, diphenyl, anthracene, acenaphthene, retene and the like, including their homologs. The preferred method of producing these reactive and soluble alkali metal derivatives was first described by N. D. Scott in U. S. Patent 2,027,000 and a continuation of this patent, U. S. Patent 2,019,832. Certain classes of ether solvents were found to have a very specific action in promoting the reaction of alkali metals with aromatic hydrocarbons to form these intermediate addition products which according to the present invention must be used in the dissolved state in the ether solvents in which they have been prepared. Ethers which have been found useful in preparing these alkali metal addition products include all polyethers and all mono ethers containing a CH$_3$—O— group and in which the ratio of the number of oxygen atoms to the number of carbon atoms is not less than 1:4 and whose structures are stable in contact with the alkali metal and its aromatic hydrocarbon addition complex in question.

By "stable" ethers we do not mean that the ethers may not react in some reversible reaction with the alkali metal and/or aromatic hydrocarbon since indications are that the ethers in effecting the reactions may to some extent take part in the reaction, but the ether must not be broken up or form irreversible reaction products. Thus, for example, ethylene oxide may be considered a cyclic ether falling within the limitations given for the oxygen carbon ratio; however, it reacts, for instance, with sodium naphthalene and hence cannot satisfactorily perform the function required. There may be a very slow ether cleavage with some of the good solvents, but at a rate much slower than that of the desired reaction. In order to simplify the wording later, we further specify such ethers as are "effective" within my invention as being "stable" although as noted they may play some reactive role in causing the reactions to proceed.

Inert non-ether types of solvents, such as hydrocarbons or alkyl sulfides which do not react with the alkali metals and which in themselves are non-effective for the reactions, may be used as diluting agents for the effective ethers. There is, however, a minimum concentration for the effective ether in the non-effective solvents beyond which the reaction will not proceed. Thus, in general, the effective ether can be diluted with a non-reactive, non-effective hydrocarbon or ether up to four or five times its volume. If the dilution be as high as six to ten times the volume of the effective ether, the reaction to form the alkali metal addition product will not proceed.

By the use of these effective ethers alkali metals have been shown to add to aromatic hydrocarbons and certain hydroaromatic hydrocarbons containing more than one benzene nucleus as well as to certain nitrogen containing compounds such as n-methyl carbazol. Aromatic hydrocarbon compounds possessing a reactive methylene group are, of course, excluded from the list of hydrocarbons which will yield these addition compounds. For further description, the invention will be illustrated particularly with respect to the reaction of naphthalene with sodium, but it is to be understood that what is said thereon will apply equally well to the reaction of other alkali metals and to any of the suitable naphthalene homologues and analogues and other condensed ring systems which will allow these intermediates to form.

Effective ethers which fall within the specifications set forth above include dimethyl ether, methyl ethyl ether, ethylene glycol dimethyl ether, ethylene glycol methyl ethyl ether, ethylene glycol methyl butyl ether, ethylene glycol diethyl ether, ethylene glycol formal, glycerol formal methyl ether, the simple tri ethers of glycerol, tertiary amines and many others with similar properties which will function as solvents for the alkali metal intermediates and also mixtures of these ethers with non-effective solvents up to the concentration at which the effective ether ceases to exert its activating effect.

It is highly important that these effective ethers be essentially free from more than traces of hydroxyl or other impurities which react with sodium, especially those which yield insoluble compounds and which tend to "coat over" the surface of the metal, in order to get the addition reaction to start. The sodium should itself be clean and have been preserved under some inert solvent prior to use. The form of the sodium is immaterial, but cubes of the metal one fourth inch on an edge have been found quite satisfactory. Generally, even with the best of care in preparing the solvents, naphthalene and sodium, it is necessary to scratch the surfaces of these sodium cubes to initiate the formation of the green colored (in the case of naphthalene) sodium addition complex. A mechanical stirrer with sufficent speed to cause the sodium cubes to rub over each other lightly under the surface of a solution of naphthalene in one of the effective ethers will in a short time remove this thin protective film from the metallic surfaces and allow the reaction to proceed with great rapidity.

The effective ether solution of naphthalene will readily dissolve sodium in an amount equivalent to one gram atom of sodium for each gram molecule of naphthalene; thereafter the solution of further amounts of sodium becomes so slow as to be negligible. This is somewhat unexpected since the reaction products obtained by further treatment of the green sodium naphthalene complex, for example, with water or carbon dioxide, indicate that it is in large part the 1,4 disodium naphthalene:

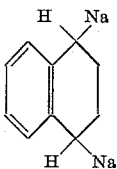

It is probable that this is an equilibrium reaction. It is also found that other isomeric disodium addition compounds are formed as evidenced by the formation of isomeric acids upon treatment with carbon dioxide.

In view of the fact that the solution which is thus prepared, and contains one gram atom of sodium for each gram molecule of naphthalene, is a highly colored green solution and readily conducts the electric current, it is possible that the addition compound may exist in solution as a free radical which may be represented by the formula:

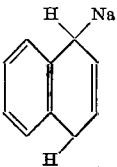

The soluble addition compound may involve the combination of disodium naphthalene with an extra molecule of naphthalene in some other manner. Its formula could be written, $$Na_2C_{10}H_8\text{—}C_{10}H_8$$

without specifying the exact method of combination. Moreover, this soluble addition product may conceivably also include some combination with the ether solvent to account for the specific action of the effective ethers. The reactions of these alkali metal addition product, however, are clearly evident and their use as intermediates is in no way limited by any hypothesis as to the probable structure in solution.

If such a solution which contains sodium equivalent to one gram atom of sodium for each gram molecule of naphthalene be treated with water or alcohol, it will yield equivalent amounts of naphthalene and dihydronaphthalene; with $CO_2$, it will yield the sodium salts of dihydronaphthalene dicarboxylic acids along with an equivalent amount of naphthalene. If, however, either the hydrolysis or the carboxylation is carried out gradually while further amounts of sodium are present in the liquid, further amounts of this sodium will dissolve as that in solution is used by the hydrolysis or carboxylation. In this manner, it is possible to react essentially all of the naphthalene and recover the major amount as dihydronaphthalene or dihydronaphthalene dicarboxylic acids.

The present invention is not restricted to the use of the above described ethers as solvents for the reaction between the polycyclic aromatic hydrocarbons and alkali metals. For example, certain amino compounds are also effective as solvents for promoting these alkali metal addition reactions. These amino compounds, which are described in co-pending applications filed by J. F. Walker and N. D. Scott, include the amines: trimethylamine, dimethyl ethylamine, and tetramethyl ethylene diamine and a variety of amino ethers having tertiary amino groups, such as dimethylamino dimethyl ether, dimethylaminoethyl methyl ether, diethylaminoethyl methyl ether, dimethylaminoethyl diether of ethylene glycol and diethylamino dioxan.

In the practice of the present invention, I first prepare a solution of a colored alkali metal addition compound, preferably as above described. I then add the organic acid to be reacted therewith. Preferably, the acid is added slowly, while continuously agitating the reaction mixture. It is also preferable first to dissolve the acid in the solvent used to make the colored addition compound or in another solvent in which the addition compound is soluble and add the acid in such dissolved form. For the best results, the acid or its solution should be substantially anhydrous and the reaction mixture should be protected from the influence of oxygen, e. g., by maintenance of inert gas atmosphere, during the reaction. The reaction which occurs may be represented, in the case of sodium-naphthalene addition compound, by the following equation (where "R" may be either hydrogen or an organic radical):

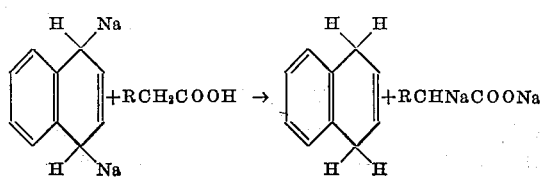

The resulting suspension of di-alkali metal compound of the acid may then be directly reacted with carbon dioxide or other reagent to form a derivative of the original acid. For example, the reaction with carbon dioxide may be represented:

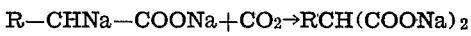

R—CHNa—COONa+CO$_2$→RCH(COONa)$_2$

Upon hydrolysis, e. g., with dilute aqueous acid solution the free, dibasic acid is formed and may be recovered and purified by known means. This method is well adapted for converting acetic acid to malonic acid and for preparing various alkyl and aryl derivatives of malonic acid.

My invention is further illustrated by the following example.

*Example*

To a solution of 12.8 grams naphthalene in 100 cc. dimethyl glycol ether was added 2.3 grams of sodium wire. After agitation of this mixture for about 3 hours, at which time all the sodium has dissolved to form green solid naphthalene, 6.8 grams of phenyl acetic acid dissolved in 25 cc. of dimethyl glycol ether was gradually added. The resultant reaction mixture then took on a purple color resembling grape juice. The purple colored reaction mixture was carboxylated and filtered. The sodium salts thus obtained were dried to remove ether solvent and dissolved in water. The salt solution was acidulated with 3.2 cc. of conc. sulfuric acid, filtered to remove naphthalene, and extracted with ether. On evaporation of the ether from this extract, a crystalline residue was obtained from which phenyl acetic acid was removed by vacuum sublimation. The unsublimed residue consisted of phenyl malonic acid melting at approximately 153° C. with decomposition. The neutralization equivalent of the product was 83 (theory=90).

While it is preferable to react a free organic acid having at least one hydrogen atom on the carbon atom adjacent to a carboxy group (alpha position) in practicing my invention as above described, I also may similarly react other carboxy compounds, having at least one hydrogen atom in the alphat position, e. g., alkali metal salts or other salts of such acids. Examples are the reactions of sodium acetate or sodium phenyl acetate with the sodium addition compound of naphthalene.

I claim:

1. A process comprising reacting a solution solution of the alkali metal addition compound of a polycyclic aromatic hydrocarbon with an organic carboxy compound having at least one hydrogen atom on the carbon atom adjacent to a carboxy group said alkali metal addition compound being dissolved in an activating solvent for the reaction.

2. A process comprising reacting a solution of the alkali metal addition compound of naphthalene with an organic acid having the formula RCH$_2$COOH, where R represents a member of the group consisting of hydrogen, alkyl and aryl, said alkali metal addition compound being dissolved in an activating solvent for the reaction.

3. A process comprising reacting a solution of the sodium addition compound of naphthalene with acetic acid, said sodium addition compound being dissolved in an activating solvent for the reaction.

4. A process comprising reacting a solution of the sodium addition compound of naphthalene with phenyl acetic acid, said sodium addition compound being dissolved in an activating solvent for the reaction.

5. A process comprising reacting a solution of the alkali metal addition compound of a polycyclic aromatic hydrocarbon with an organic acid having at least one hydrogen atom on the carbon atom adjacent to a carboxy group, said alkali metal addition compound being dissolved in an activating solvent for the reaction and thereafter reacting the resulting alkali metal compound of said acid with an organic halide.

6. A process comprising reacting a solution of the alkali metal addition compound of a polycyclic aromatic hydrocarbon with an organic acid having at least one hydrogen atom on the carbon atom adjacent to a carboxy group, said alkali metal addition compound being dissolved in an activating solvent for the reaction, and thereafter reacting the resulting alkali metal compound of said acid with carbon dioxide.

7. A process comprising reacting a solution of the alkali metal addition compound of a polycyclic aromatic hydrocarbon with an organic acid having the formula RCH$_2$COOH, where R represents a member of the group consisting of hydrogen, alkyl and aryl, said alkali metal addition compound being dissolved in an activating solvent for the reaction, and thereafter reacting the resulting alkali metal compound of said acid with carbon dioxide.

8. A process comprising reacting a solution of the sodium addition compound of naphthalene with acetic acid, said sodium addition compound being dissolved in an activating solvent for the reaction and thereafter reacting the resulting sodium compound of said acid with carbon dioxide.

9. A process comprising reacting a solution of the sodium addition compound of naphthalene with phenyl acetic acid, said sodium addition compound being dissolved in an activating solvent for the reaction, and thereafter reacting the resulting sodium compound of said acid with carbon dioxide.

10. A process comprising reacting a solution of the alkali metal addition compound of a polycyclic aromatic hydrocarbon with an organic carboxy compound having at least one hydrogen atom on the carbon atom adjacent to a carboxy group, said alkali metal addition compound being dissolved in an activating solvent for the reaction, and thereafter reacting the resulting alkali metal substitution compound of said carboxy compound with a reagent reactive therewith to form an organic compound derivative of said carboxy compound.

11. A process comprising reacting a solution of the alkali metal addition compound of a polycyclic aromatic hydrocarbon with an organic acid having at least one hydrogen atom on the carbon atom adjacent to a carboxy group, said alkali metal addition compound being dissolved in an activating solvent for the reaction, and thereafter reacting the resulting alkali metal substitution compound of said acid with a reagent reactive therewith to form an organic compound derivative of said acid.

JOSEPH FREDERIC WALKER.